United States Patent
Ogura et al.

(10) Patent No.: US 9,181,399 B2
(45) Date of Patent: Nov. 10, 2015

(54) METHOD FOR PRODUCING POLYSILOXANE

(71) Applicant: TOAGOSEI CO., LTD., Minato-ku (JP)

(72) Inventors: Kinuko Ogura, Nagoya (JP); Akinori Kitamura, Nagoya (JP)

(73) Assignee: TOAGOSEI CO., LTD., Minato-ku (JP)

( * ) Notice: Subject to any disclaimer, the term of this patent is extended or adjusted under 35 U.S.C. 154(b) by 0 days.

(21) Appl. No.: 14/350,464

(22) PCT Filed: Dec. 26, 2012

(86) PCT No.: PCT/JP2012/083581
§ 371 (c)(1),
(2) Date: Apr. 8, 2014

(87) PCT Pub. No.: WO2013/099909
PCT Pub. Date: Jul. 4, 2013

(65) Prior Publication Data
US 2014/0303392 A1    Oct. 9, 2014

(30) Foreign Application Priority Data

Dec. 28, 2011 (JP) ................. 2011-288794

(51) Int. Cl.
*C07F 7/18* (2006.01)
*C08G 77/20* (2006.01)
*C08G 77/06* (2006.01)

(52) U.S. Cl.
CPC ............... *C08G 77/20* (2013.01); *C08G 77/06* (2013.01)

(58) Field of Classification Search
CPC ............................... C08G 77/20; C08G 77/06
USPC ......................................... 556/450, 451, 453
See application file for complete search history.

(56) References Cited

U.S. PATENT DOCUMENTS

| | | |
|---|---|---|
| 2007/0134424 A1 | 6/2007 | Tauchi et al. |
| 2010/0029841 A1 | 2/2010 | Tauchi et al. |
| 2010/0280210 A1* | 11/2010 | Kitamura et al. ............... 528/31 |

FOREIGN PATENT DOCUMENTS

| | | |
|---|---|---|
| CN | 1720282 A | 1/2006 |
| CN | 1886410 A | 12/2006 |
| CN | 101296999 A | 10/2008 |
| CN | 101503421 A | 8/2009 |
| CN | 101541863 A | 9/2009 |
| JP | 2000-344894 A | 12/2000 |
| JP | 2008-231403 A | 10/2008 |
| JP | 2010-143973 A | 7/2010 |
| JP | 2011-52170 A | 3/2011 |
| JP | 2011-137050 A | 7/2011 |
| WO | WO 2005/010077 A1 | 2/2005 |
| WO | WO 2009/066608 A1 | 5/2009 |

OTHER PUBLICATIONS

International Search Report issued Apr. 9, 2013 in corresponding PCT/JP2012/083581.
Office Action as received in the corresponding Chinese Patent Application No. 201280045961.3 dated Apr. 10, 2015 w/English Translation.

* cited by examiner

*Primary Examiner* — Sudhakar Katakam
*Assistant Examiner* — Pancham Bakshi
(74) *Attorney, Agent, or Firm* — Oblon, McClelland, Maier & Neustadt, L.L.P.

(57) ABSTRACT

The present invention is a method for producing a polysiloxane represented by formula (1), which includes a condensation step wherein a hydrolysis/polycondenzation of a starting material monomer that forms a constituent unit is carried out in a reaction solvent that contains at least one alcohol that is selected from among secondary alcohols having 4-6 carbon atoms and tertiary alcohols having 4-6 carbon atoms. The method for producing a polysiloxane of the present invention suppresses problems such as gelation that occurs during the production, and increase in the molecular weight or gelation that occurs during storage after the production or the like.

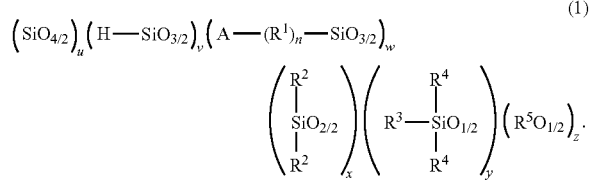

14 Claims, No Drawings

METHOD FOR PRODUCING POLYSILOXANE

This application is a National Stage of PCT/JP2012/083581 filed Dec. 26, 2012 and claims the benefit of JP 2011-288794 filed Dec. 28, 2011.

FIELD OF THE INVENTION

The present invention relates to a method for producing a polysiloxane that has a carbon-carbon unsaturated bond and a hydrosilyl group, and is capable of undergoing hydrosilation.

BACKGROUND ART

When producing a semiconductor related product or a liquid crystal related product, a finer or multi-layer pattern has been increasingly formed on a substrate for a semiconductor device or a liquid crystal display in order to deal with a demand for an increase in degree of integration, an increase in operation speed, implementation of multifunctionality, and the like. Therefore, it has become indispensable to planarize the surface of the substrate. A coating liquid that produces a silica-based film (spin-on-glass (SOG) film) through curing has been generally used as a planarization film or an interlayer insulating film when producing a substrate for a semiconductor device or a liquid crystal display. Specifically, a coating liquid that includes an alkoxysilane hydrolysate or the like is applied to a substrate by spin coating or the like, and the resulting film is heated to remove a volatile component to obtain a silica-based film that includes an Si—O—Si bond.

Since the planarization film and the interlayer insulating film are generally heated during the substrate production process, a resin that exhibits higher heat resistance has been desired. For example, Patent Document 1 proposes a polysiloxane that includes a carbon-carbon unsaturated bond and a hydrosilyl group, and is capable of undergoing hydrosilation, as a heat-resistant resin raw material. Patent Document 1 states that various organic solvents may be used as a medium for dissolving the polysiloxane. In the examples of Patent Document 1, a mixed solvent of toluene and ethanol is used as the reaction solvent. However, Patent Document 1 states that the resulting polysiloxane could not be dissolved in toluene. Patent Document 1 does not disclose or suggest that the storage stability of the polysiloxane during or after production varies depending on the type of reaction solvent.

Patent Document 2 also discloses a polysiloxane that can be dissolved in an organic solvent and has a structure that allows hydrosilation. Patent Document 2 describes an aromatic hydrocarbon, an ether, and an ester as the reaction solvent that can be used when subjecting the raw material monomer to hydrolysis and polycondensation. Patent Document 2 describes that a lower alcohol such as methanol, ethanol, and 2-propanol may be used in combination with the above nonpolar solvent. In the examples of Patent Document 2, a mixed solvent of xylene and 2-propanol is used as the reaction solvent. Patent Document 2 does not disclose or suggest that the storage stability of the polysiloxane during or after production varies depending on the type of reaction solvent.

Patent Document 3 discloses a curable coating composition that includes a polysiloxane having a structure that allows hydrosilation, and an organic solvent that does not include a hydroxyl group, and has a boiling point of 80° C. to 130° C. Patent Document 3 states that the molecular weight of the polysiloxane may increase during storage, or the coating composition may gel, or paint coat particles may occur when the organic solvent includes a hydroxyl group.

As described above, a method has been known that subjects a raw material monomer to hydrolysis and polycondensation when producing a polysiloxane that includes a carbon-carbon unsaturated bond and a hydrosilyl group, and is capable of undergoing hydrosilation. It has also been known to use various organic solvents as the reaction solvent. But it has not been known that a capability to prevent gelation during production, and the storage stability of the polysiloxane after production vary depending on the type of organic solvent. It has been known that the storage stability of a curable coating composition containing a polysiloxane that includes a carbon-carbon unsaturated bond and a hydrosilyl group, and is capable of undergoing hydrosilation, is impaired when the curable coating composition includes an organic solvent having a hydroxyl group, and the molecular weight of the polysiloxane may increase, or gelation may occur. Specifically, selection of the reaction solvent has not been known as a means for efficiently producing a polysiloxane or product having stable quality by preventing gelation or an increase in molecular weight of the polysiloxane. Since it has been known that an organic solvent having a hydroxyl group is undesirable as the solvent included in the composition, the above documents teach away from using an organic solvent having a hydroxyl group in order to solve the above technical problem.

PRIOR TECHNICAL DOCUMENT

Patent Document

[Patent Document 1] WO2005/010077
[Patent Document 2] WO2009/066608
[Patent Document 3] JP-A 2011-52170

SUMMARY OF THE INVENTION

Problems that the Invention is to Solve

Since a polysiloxane that includes a carbon-carbon unsaturated bond and a hydrosilyl group, and is capable of undergoing hydrosilation has been widely used, a method that can efficiently produce a product having stable quality has been desired. An object of the present invention is to provide a method for producing a polysiloxane that suppresses gelation during production, an increase in molecular weight of the polysiloxane and gelation after production, and the like.

Means for Solving the Problems

The present inventors found that gelation during a reaction can be prevented, and an increase in molecular weight of a polysiloxane and gelation rarely occur during a storage stability test performed after production when a polysiloxane represented by the following general formula (1) that includes a carbon-carbon unsaturated bond and a hydrosilyl group, and can undergo hydrosilation, is produced using at least one alcohol selected from a secondary alcohol having 4 to 6 carbon atoms and a tertiary alcohol having 4 to 6 carbon atoms, that is to say a polar solvent (hereinafter may be referred to as "the alcohol according to the invention") as a reaction solvent when subjecting a specific raw material monomer to hydrolysis and polycondensation.

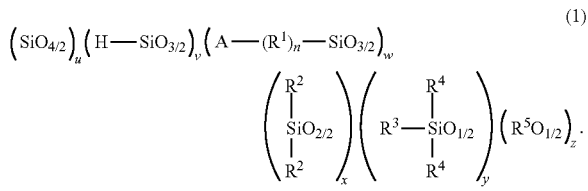

(1)

(In the formula, A is an organic group having 2 to 10 carbon atoms that includes a carbon-carbon unsaturated bond and is capable of undergoing hydrosilation, $R^1$ is at least one group selected from an alkylene group having 1 to 20 carbon atoms, a divalent aromatic group having 6 to 20 carbon atoms, and a divalent alicyclic group having 3 to 20 carbon atoms, n is 0 or 1, $R^2$ is a hydrogen atom or at least one group selected from an alkyl group having 1 to 10 carbon atoms, and an organic group having 2 to 10 carbon atoms that includes a carbon-carbon unsaturated bond and is capable of undergoing hydrosilation, provided that a plurality of $R^2$ in one molecule are either identical or different, $R^3$ is a hydrogen atom or at least one group selected from an alkyl group having 1 to 10 carbon atoms, and an organic group having 2 to 10 carbon atoms that includes a carbon-carbon unsaturated bond and is capable of undergoing hydrosilation, $R^4$ is a hydrogen atom or at least one group selected from an alkyl group having 1 to 10 carbon atoms, and an organic group having 2 to 10 carbon atoms that includes a carbon-carbon unsaturated bond and is capable of undergoing hydrosilation, provided that a plurality of $R^4$ in one molecule are either identical or different, $R^5$ is a hydrogen atom or an alkyl group having 1 to 6 carbon atoms, v is a positive number, u, w, x, y, and z are 0 or a positive number, provided that at least one of w, x, and y is a positive number, $0 \leq u/(v+w+x+y) \leq 2$, $0 \leq x/(v+w) \leq 2$, $0 \leq y/(v+w) \leq 2$, $0 \leq z/(v+w+x+y) \leq 1$, and at least one of $R^2$, $R^3$, and $R^4$ is an organic group having 2 to 10 carbon atoms that includes a carbon-carbon unsaturated bond and is capable of undergoing hydrosilation when w is 0.)

The raw material monomer includes a compound that forms the following structural unit (1-2) through condensation, and at least one compound selected from a compound that forms the following structural unit (1-3) through condensation, a compound that forms the following structural unit (1-4) through condensation, and a compound that forms the following structural unit (1-5) through condensation.

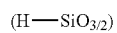

(1-2)

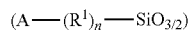

(1-3)

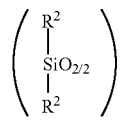

(1-4)

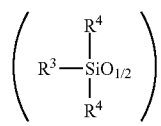

(1-5)

Effect of the Invention

The present invention thus prevents gelation during a reaction when producing a polysiloxane that includes a carbon-carbon unsaturated bond and a hydrosilyl group, and is capable of undergoing hydrosilation, and ensures that the resulting polysiloxane is excellent in storage stability, and can be stored without showing an increase in molecular weight or gelation.

EMBODIMENTS FOR CARRYING OUT THE INVENTION

Hereinafter, a method for producing a polysiloxane according to several exemplary embodiments in the present invention is described, but the invention is not limited to the following exemplary embodiments.

Note that the carbon-carbon unsaturated bond included in the organic group A or the like refers to a carbon-carbon double bond or a carbon-carbon triple bond.

The resulting polysiloxane in the production method of the present invention is described.

Clearly from the general formula (1), the polysiloxane is a condensate in which the structural units (1-1) to (1-6) are bonded through a siloxane bond. In the general formula (I), u, v, w, x, y, and z are the molar quantity of each structural unit. The polysiloxane may include only one type of structural unit (1-3), or may include two or more types of structural unit (1-3). The polysiloxane may include only one type of structural unit (1-4), or may include two or more types of structural unit (1-4). The polysiloxane may include only one type of structural unit (1-5), or may include two or more types of structural unit (1-5). The polysiloxane may include only one type of structural unit (1-6), or may include two or more types of structural unit (1-6). The structural units included in the polysiloxane molecule need not necessarily be arranged in the order represented by the general formula (1).

(1-1)

(1-2)

(1-3)

(1-4)

(1-5)

(1-6)

In the polysiloxane represented by the general formula (1), the number of structural units (1-2) per molecule is preferably in a range from 5 to 100, more preferably from 6 to 80, further preferably from 7 to 60, and particularly from 8 to 40. The number of structural units (1-3) is preferably in a range from 0 to 40, more preferably from 0 to 30, further preferably from 0 to 20, and particularly from 0 to 10. The number of structural units (1-4) is preferably in a range from 0 to 40, more preferably from 0 to 30, further preferably from 0 to 20, and particularly from 0 to 10. The number of structural units (1-5) is preferably 0.1 to 50, more preferably from 0.5 to 30, further preferably from 1 to 20, and particularly from 2 to 10. The number of structural units (1-6) is preferably 0.1 to 20, more preferably from 0.2 to 10, further preferably from 0.3 to 8, and particularly from 0.5 to 5.

The organic group A included in the structural unit (1-3) is an organic group having 2 to 10 carbon atoms that includes a carbon-carbon unsaturated bond and is capable of undergoing hydrosilation. Namely the organic group A is a functional group that includes a carbon-carbon double bond or a carbon-carbon triple bond, and is capable of undergoing hydrosilation. Specific examples of the organic group A include a vinyl group, an ortho-styryl group, a meta-styryl group, a para-styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentynyl group, a 3-methyl-1-butynyl group, a phenylbutynyl group, and the like. The polysiloxane according to the present invention may include two or more organic groups A. In this case, the two or more organic groups A are either identical or different. The polysiloxane may include a plurality of identical organic groups A and a different organic group A. It is preferable that the organic group A be a vinyl group that includes a small number of carbon atoms or a para-styryl group that exhibits excellent reactivity since a raw material monomer forming the structural unit (1-3) can be easily obtained. When the number of carbon atoms is small, a cured product of the resulting polysiloxane has a high inorganic moiety content, and exhibits excellent heat resistance. Note that the inorganic moiety refers to an SiO (siloxane) moiety.

In the structural unit (1-3), $R^1$ is at least one group selected from an alkylene group having 1 to 20 carbon atoms, a divalent aromatic group having 6 to 20 carbon atoms, and a divalent alicyclic group having 3 to 20 carbon atoms.

Examples of the alkylene group having 1 to 20 carbon atoms include a methylene group, an ethylene group, an n-propylene group, an i-propylene group, an n-butylene group, an i-butylene group, and the like. Examples of the divalent aromatic group having 6 to 20 carbon atoms include a phenylene group, a naphthylene group, and the like. Examples of the divalent alicyclic group having 3 to 20 carbon atoms include a divalent hydrocarbon group that includes a norbornene skeleton, a tricyclodecane skeleton, or an adamantane skeleton, and the like.

In the structural unit (1-3), n is 0 or 1. It is preferable that n is 0 since the resulting cured film exhibits high heat resistance when the number of carbon atoms is small.

In the structural unit (1-4), $R^2$ is a hydrogen atom or at least one group selected from an alkyl group having 1 to 10 carbon atoms, and an organic group having 2 to 10 carbon atoms that includes a carbon-carbon unsaturated bond and is capable of undergoing hydrosilation.

The alkyl group may be either an aliphatic group or an alicyclic group, and may be either linear or branched. Examples of the alkyl group include a methyl group, an ethyl group, a propyl group, a butyl group, a pentyl group, a hexyl group, a heptyl group, an octyl group, a nonyl group, a decyl group, and the like. The organic group having 2 to 10 carbon atoms that includes a carbon-carbon unsaturated bond and is capable of undergoing hydrosilation is a functional group that includes a carbon-carbon double bond or a carbon-carbon triple bond, and is capable of undergoing hydrosilation. Specific example thereof includes a vinyl group, an ortho-styryl group, a meta-styryl group, a para-styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentynyl group, a 3-methyl-1-butynyl group, a phenylbutynyl group, and the like. A plurality of $R^2$ included in the structural unit (1-4) are either identical or different. It is preferable that $R^2$ is a hydrogen atom, a methyl group, or a vinyl group since the number of carbon atoms is small, and a cured product of the resulting polysiloxane exhibits excellent heat resistance.

In the structural unit (1-5), $R^3$ is a hydrogen atom or at least one group selected from an alkyl group having 1 to 10 carbon atoms, and an organic group having 2 to 10 carbon atoms that includes a carbon-carbon unsaturated bond and is capable of undergoing hydrosilation.

The alkyl group may be either an aliphatic group or an alicyclic group, and may be either linear or branched. Examples of the alkyl group include a methyl group, an ethyl group, a propyl group, a butyl group, a pentyl group, a hexyl group, a heptyl group, an octyl group, a nonyl group, a decyl group, and the like. The organic group having 2 to 10 carbon atoms that includes a carbon-carbon unsaturated bond and is capable of undergoing hydrosilation is a functional group that includes a carbon-carbon double bond or a carbon-carbon triple bond, and is capable of undergoing hydrosilation. Specific example thereof includes a vinyl group, an ortho-styryl group, a meta-styryl group, a para-styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentynyl group, a 3-methyl-1-butynyl group, a phenylbutynyl group, and the like. A plurality of $R^3$ included in the structural unit (1-5) are either identical or different. It is preferable that $R^3$ is a hydrogen atom or a vinyl group since $R^3$ can take part in a polysiloxane curing reaction, the number of carbon atoms is small, and a cured product of the resulting polysiloxane exhibits excellent heat resistance.

In the structural unit (1-5), $R^4$ is a hydrogen atom or at least one group selected from an alkyl group having 1 to 10 carbon atoms, and an organic group having 2 to 10 carbon atoms that includes a carbon-carbon unsaturated bond and is capable of undergoing hydrosilation.

The alkyl group may be either an aliphatic group or an alicyclic group, and may be either linear or branched. Examples of the alkyl group include a methyl group, an ethyl group, a propyl group, a butyl group, a pentyl group, a hexyl group, a heptyl group, an octyl group, a nonyl group, a decyl group, and the like. The organic group having 2 to 10 carbon atoms that includes a carbon-carbon unsaturated bond and is capable of undergoing hydrosilation is a functional group that includes a carbon-carbon double bond or a carbon-carbon triple bond, and is capable of undergoing hydrosilation. Specific example thereof includes a vinyl group, an ortho-styryl group, a meta-styryl group, a para-styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentynyl group, a 3-methyl-1-butynyl group, a phenylbutynyl group, and the like. A plurality of $R^4$ included in the structural unit (1-5) are either identical or different. It is preferable that $R^4$ is a hydrogen atom, a methyl group, or a vinyl group since excellent reactivity is obtained, and the number of carbon atoms is small. It is particularly preferable that $R^4$ is a methyl group or a vinyl group from the viewpoint of ease of handling of the raw material monomer and the intermediate product.

In the structural unit (1-6), $R^5$ is a hydrogen atom or an alkyl group having 1 to 6 carbon atoms. The alkyl group may be either an aliphatic group or an alicyclic group, and may be either linear or branched. Examples of the alkyl group include a methyl group, an ethyl group, a propyl group, a butyl group, a pentyl group, a hexyl group, and the like. The structural unit (1-6) is an alkoxy group (hydrolyzable group) included in the raw material monomer (described later), or an alkoxy group produced by substitution of the alcohol included in the reaction solvent with a hydrolyzable group included in the raw material monomer. The structural unit (1-6) may be a structural unit that remains in the molecule without undergoing hydrolysis and polycondensation, or may be a structural unit that remains in the molecule after undergoing hydrolysis without undergoing polycondensation.

In the general formula (1), the relationship of u, v, w, x, and y is preferably "$0 \leq u/(v+w+x+y) \leq 2$", more preferably "$0 \leq u/(v+w+x+y) \leq 1.5$", further preferably "$0 \leq u/(v+w+x+y) \leq 1$", and particularly "$0 \leq u/(v+w+x+y) \leq 0.8$". If the ratio "$u/(v+w+x+y)$" is too large, the polysiloxane tends to gel, or tends to exhibit decreased storage stability.

In the general formula (1), the relationship of v, w, and x is preferably "$0 \leq x/(v+w) \leq 2$", more preferably "$0 \leq x/(v+w) \leq 1$", further preferably "$0 \leq x/(v+w) \leq 0.7$", and particularly "$0 \leq x/(v+w) \leq 0.5$". If the ratio "$x/(v+w)$" is too large, a cured product of the resulting polysiloxane tends to exhibit decreased heat resistance when heated in the absence of a catalyst.

In the general formula (1), the relationship of v, w, and y is preferably "$0 \leq y/(v+w) \leq 2$", more preferably "$0 \leq y/(v+w) \leq 1$", further preferably "$0 \leq y/(v+w) \leq 0.7$", and particularly "$0 \leq y/(v+w) \leq 0.4$". If the ratio "$y/(v+w)$" is too large, a cured product of the resulting polysiloxane tends to exhibit decreased heat resistance when heated in the absence of a catalyst.

In the general formula (1), the relationship of v, w, x, y, and z is preferably "$0.01 \leq z/(v+w+x+y) \leq 1$", more preferably "$0.02 \leq z/(v+w+x+y) \leq 0.5$", and particularly "$0.03 \leq z/(v+w+x+y) \leq 0.3$". If the ratio "$z/(v+w+x+y)$" is too small, curability tends to deteriorate during heating in the absence of a catalyst. If the ratio "$z/(v+w+x+y)$" is too large, the resulting polysiloxane tends to exhibit decreased storage stability, or a cured product of the resulting polysiloxane tends to exhibit decreased heat resistance when heated.

When w is 0, at least one of $R^2$, $R^3$, and $R^4$ is an organic group having 2 to 10 carbon atoms that includes a carbon-carbon unsaturated bond and is capable of undergoing hydrosilation. When v, w, x, y, and z in the general formula (1) satisfy the above condition, the polysiloxane exhibits low viscosity and an excellent handling capability, and can produce a uniform, smooth, and flat cured film that exhibits excellent heat resistance.

A number average molecular weight of the polysiloxane according to the present invention is preferably in a range from 300 to 30,000. The polysiloxane is easily dissolved in an organic solvent, and exhibits moderate solution viscosity and excellent storage stability. The number average molecular weight is more preferably from 500 to 15,000, further preferably from 700 to 10,000, and particularly from 1,000 to 5,000. The number average molecular weight may be determined by gel permeation chromatography (GPC) under the conditions described later in connection with the examples using polystyrene as a standard substance, for example.

The method for producing a polysiloxane of the present invention is described below.

The production method of a polysiloxane of the invention includes a condensation step that subjects a raw material monomer that forms the structural units represented by the general formula (1) through condensation to hydrolysis and polycondensation in a reaction solvent containing at least one alcohol selected from a secondary alcohol having 4 to 6 carbon atoms and a tertiary alcohol having 4 to 6 carbon atoms (hereinafter may be referred to as "the alcohol according to the invention"). The condensation step may utilize a silicon compound that forms the structural unit (1-1), and has four siloxane bond-forming groups (hereinafter referred to as "Q monomer"), a silicon compound that forms the structural unit (1-2) and (1-3), and has three siloxane bond-forming groups (hereinafter referred to as "T monomer"), a silicon compound that forms the structural unit (1-4), and has two siloxane bond-forming groups (hereinafter referred to as "D monomer"), and a silicon compound that forms the structural unit (1-5), and has one siloxane bond-forming group (hereinafter referred to as "M monomer"). In the present invention, the condensation step utilizes at least one monomer selected from the T monomer that forms the structural unit (1-2), the T monomer that forms the structural unit (1-3), the D monomer that forms the structural unit (1-4), and the M monomer that forms the structural unit (1-5). It is preferable that the method include an evaporation step that evaporates the reaction solvent, a by-product, a residual monomer, water, or the like included in the reaction mixture after effecting hydrolysis and polycondensation in the presence of the reaction solvent containing the alcohol according to the invention.

The siloxane bond-forming group included in the Q monomer, the T monomer, the D monomer, or the M monomer (raw material monomer) is a hydroxyl group or a hydrolyzable group. Examples of the hydrolyzable group include a halogeno group, an alkoxy group, and the like. It is preferable that at least one of the Q monomer, the T monomer, the D monomer, and the M monomer include the hydrolyzable group. It is preferable to use an alkoxy group (more preferably an alkoxy group having 1 to 3 carbon atoms) as the hydrolyzable group since an alkoxy group exhibits excellent hydrolyzability, and does not produce an acid as a by-product.

It is preferable that the siloxane bond-forming group included in the Q monomer, the T monomer, or the D monomer be an alkoxy group, and the siloxane bond-forming group included in the M monomer be an alkoxy group or a siloxy group. The monomer corresponding to each structural unit may be used either alone or in combination.

Examples of the Q monomer that forms the structural unit (1-1) include tetramethoxysilane, tetraethoxysilane, tetrapropoxysilane, tetrabutoxysilane, and the like. Examples of the T monomer that forms the structural unit (1-2) include trimethoxysilane, triethoxysilane, tripropoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, cyclohexyltrimethoxysilane, cyclohexyltriethoxysilane, trichlorosilane, and the like. Examples of the T monomer that forms the structural unit (1-3) include trimethoxyvinylsilane, triethoxyvinylsilane, (p-styryl)trimethoxysilane, (p-styryl)triethoxysilane, (3-methacryloyloxypropyl)trimethoxysilane, (3-methacryloyloxypropyl)triethoxysilane, (3-acryloyloxypropyl)trimethoxysilane, (3-acryloyloxypropyl)triethoxysilane, and the like. Examples of the D monomer that forms the structural unit (1-4) include dimethoxydimethylsilane, dimethoxydiethylsilane, diethoxydimethylsilane, diethoxydiethylsilane, dipropoxydimethylsilane, dipropoxydiethylsilane, dimethoxybenzylmethylsilane, diethoxybenzylmethylsilane, dichlorodimethylsilane, and the like. Examples of the M monomer that forms the structural unit (1-5) include hexamethyldisiloxane (that forms two structural units (1-5) through hydrolysis), hexaethyldisiloxane, hexapropyldisiloxane, 1,1, 3,3-tetramethyldisiloxane, 1,3-divinyl-1,1,3,3-tetramethyldisiloxane, methoxydimethylsilane, ethoxydimethylsilane, methoxydimethylvinylsilane, ethoxydimethylvinylsilane, methoxytrimethylsilane, ethoxytrimethylsilane, methoxydimethylphenylsilane, ethoxydimethylphenylsilane, chlorodimethylsilane, chlorodimethylvinylsilane, chlorotrimethylsilane, dimethylsilanol, dimethylvinylsilanol, trimethylsilanol, triethylsilanol, tripropylsilanol, tributylsilanol, and the like. Examples of the organic compound that forms the structural unit (1-6) include 2-propanol, 2-butanol, methanol, ethanol, and the like.

The reaction solvent used for the condensation step includes the alcohol according to the invention. When the alcohol is used in an amount of 0.5% or more by mass (including the amount of alcohol that is added during hydrolysis and polycondensation) based on the total amount of the reaction solvent, it is possible to suppress gelation of the resulting polysiloxane. The usage amount thereof is preferably in the range from 1% to 60% by mass, and further preferably from 3% to 40% by mass.

The alcohol included in the reaction solvent is an alcohol in a narrow sense that is represented by R—OH in the present invention. The alcohol is a compound that does not include an additional functional group other than the alcoholic hydroxyl group. Specific examples of the alcohol include 2-butanol, 2-pentanol, 3-pentanol, 2-methyl-2butanol, 3-methyl-2-butanol, cyclopentanol, 2-hexanol, 3-hexanol, 2-methyl-2-pentanol, 3-methyl-2-pentanol, 2-methyl-3-pentanol, 3-methyl-3-pentanol, 2-ethyl-2-butanol, 2,3-dimethyl-2-butanol, cyclohexanol, and the like. Among these, a secondary alcohol such as 2-butanol, 2-pentanol, 3-pentanol, 3-methyl-2-butanol, cyclopentanol, 2-hexanol, 3-hexanol, 3-methyl-2-pentanol, and cyclohexanol is preferable. The alcohol is more preferably a compound that can dissolve water at a concentration necessary for the condensation step. Such an alcohol is a compound that is capable of dissolving 10 g or more of water at a temperature of 20° C. per 100 g of the alcohol. In the present invention, 2-butanol is particularly preferred.

The reaction solvent used in the condensation step may include only the alcohol according to the invention, or may be a mixed solvent of the alcohol and at least one sub-solvent. The sub-solvent may be a polar solvent, a nonpolar solvent, or a combination thereof. Examples of a preferable polar solvent include a secondary or tertiary alcohol having 3 or 7 to 10 carbon atoms, a diol having 2 to 20 carbon atoms, and the like. When using a primary alcohol as the sub-solvent, the primary alcohol is preferably used in an amount of 5% or less by mass based on the total amount of the reaction solvent. The polar solvent is preferably 2-propanol that can be inexpensively obtained industrially. When 2-propanol and the alcohol according to the invention are used in combination, a necessary amount of water can be dissolved, and the advantageous effects of the invention can be achieved even if the alcohol cannot dissolve water at a concentration necessary for the hydrolysis step. The polar solvent is preferably used in an amount of 20 parts or less by mass, more preferably in a range from 1 to 20 parts by mass, and particularly from 3 to 10 parts by mass based on 1 part by mass of the alcohol according to the invention.

When a nonpolar solvent is used as the sub-solvent in the present invention, it is possible to increase the solubility of the raw material monomer that is not easily dissolved in a polar solvent, or increase the solubility of the entire raw material monomer and the product to implement hydrolysis and polycondensation at a high concentration. The nonpolar solvent is not particularly limited as long as the nonpolar solvent is miscible (compatible) with the alcohol according to the invention and an optional polar solvent. Examples of the nonpolar solvent include an aliphatic hydrocarbon, an alicyclic hydrocarbon, an aromatic hydrocarbon, a chlorinated hydrocarbon, an alcohol, an ether, an amide, a ketone, an ester, a cellosolve, and the like. Among these, an aliphatic hydrocarbon, an alicyclic hydrocarbon, and an aromatic hydrocarbon are preferable. It is particularly to use n-hexane, isohexane, cyclohexane, heptane, toluene, xylene, methylene chloride, and the like since these compounds are azeotropic with water. These compounds make it possible to efficiently evaporate water when removing the reaction solvent from the reaction mixture including the polysiloxane by distillation after the condensation step. It is particularly preferable to use xylene which is an aromatic hydrocarbon as the nonpolar solvent due to a relatively high boiling point. Hydrolysis and polycondensation efficiently proceed when xylene is used even in only a small amount, and water can be efficiently evaporated from the reaction mixture after the condensation step. A usage amount of the nonpolar solvent is preferably 50 parts or less by mass, more preferably in a range from 1 to 30 parts by mass, and particularly from 5 to 20 parts by mass based on 1 part by mass of the alcohol according to the invention.

In the condensation step, hydrolysis and polycondensation are effected in the presence of water. The amount of water used to hydrolyze a hydrolyzable group included in the raw material monomer is preferably 0.5 to 5-fold mol, and more preferably 1 to 2-fold mol, based on the hydrolyzable group. The raw material monomer may be subjected to hydrolysis and polycondensation in the presence or absence of a catalyst. When the catalyst is used, an acid catalyst is preferable. Examples of the acid catalyst include an inorganic acid such as sulfuric acid, nitric acid, hydrochloric acid, and phosphoric acid; and an organic acid such as formic acid, acetic acid, oxalic acid, and p-toluenesulfonic acid. The acid catalyst is preferably used in an amount of 0.01% to 20% by mol, and more preferably 0.1% to 10% by mol, based on the total amount of silicon atoms included in the raw material monomer.

In the condensation step, whether or not hydrolysis and polycondensation have completed may be determined by the following method, for example.

In the case of using only an alkoxysilane such as ethoxydimethylsilane as the M monomer, it may be determined that the reaction has completed when the raw material monomer is not detected by gas chromatographic analysis of the reaction mixture. In the case of using only a silicon dimer such as a disiloxane (e.g., 1,1,3,3-tetramethyldisiloxane) as the M monomer, it may be determined that the reaction has completed when the Q monomer, the T monomer, and the D monomer are not detected by gas chromatographic analysis, and almost no change in height of the peak of the silicon dimer is observed on the gas chromatogram. In the case of using a silicon dimer such as a disiloxane (e.g., 1,1,3,3-tetramethyldisiloxane) and an additional M monomer as the M monomer, it may be determined that the reaction has completed when the Q monomer, the T monomer, and the D monomer are not detected by gas chromatographic analysis, and almost no change in height of the peak of the silicon dimer is observed on the gas chromatogram.

In the production method of a polysiloxane of the invention, a concentration DP (% by mass) of the polysiloxane in the reaction mixture after the condensation step is not particularly limited. The concentration of the produced polysiloxane calculated from the amount of the raw material monomer is preferably in a range from 1% to 60% by mass, and more preferably from 3% to 40% by mass based on the entire of the reaction mixture.

The concentration DP (% by mass) of the polysiloxane is defined by the following equation (4).

$$DP=[WP/(WP+WS)]\times 100 \quad (4)$$

(In the equation, WP is a mass (g) of the polysiloxane, and WS is a mass (g) of the medium (i.e., reaction solvent, alcohol isolated by hydrolysis, and excess water for hydrolysis) included in the reaction mixture.)

In the condensation step according to the production method of a polysiloxane of the invention, an auxiliary agent may be added to the reaction system. Examples of the auxiliary agent include an antifoaming agent that suppresses a situation in which the reaction mixture foams, a scale control agent that prevents adhesion of scale to a reaction vessel and a stirring shaft, a polymerization inhibitor, a hydrosilation inhibitor, and the like. The auxiliary agent may be used in an arbitrary amount. The auxiliary agent is preferably used in an amount of about 1% to 100% by mass based on the concentration of the polysiloxane in the reaction mixture.

A publicly known polymerization inhibitor may be used as long as it is possible to suppress a situation in which the hydrosilyl group or the carbon-carbon unsaturated bond included in the polysiloxane undergoes polymerization. Examples of the hydrosilation inhibitor include methylvinylcyclotetrasiloxane, an acetylene alcohol, a siloxane-modified acetylene alcohol, a hydroperoxide, a hydrosilation inhibitor having a nitrogen atom, a sulfur atom, or a phosphorus atom, and the like.

When the method of the present invention includes the evaporation step that evaporates the reaction solvent, a by-product, a residual monomer, water, and the like included in the reaction mixture obtained by the condensation step, it is possible to improve the stability of the resulting polysiloxane.

Hereinafter, the present invention is specifically described using Examples. The present invention is not limited to the Examples.

The terms "Mn" and "Mw" respectively refer to a number average molecular weight and a weight average molecular weight. The number average molecular weight and the weight average molecular weight were determined by subjecting a polymer to gel permeation chromatography (GPC) at a temperature of 40° C. using GPC columns "TSK-Gel G4000HX" and "TSK-Gel G2000HX" (type name) manufactured by Tosoh Corporation, and toluene as an eluant, and calculating the molecular weight from the retention time (standard: polystyrene).

When subjecting the polysiloxane to $^1$H-NMR analysis, the sample was dissolved in deuterated chloroform, and subjected to measurement and analysis.

The viscosity of the polysiloxane was measured at a temperature of 25° C. using an E-type viscometer.

Example 1

A four-necked flask equipped with a magnetic stirrer, a dropping funnel, a reflux condenser, and a thermometer was filled with nitrogen gas. Subsequently, the flask was charged with magnetic stirrer bars, 1,478.4 g (9 mol) of triethoxysilane, 444.7 g (3 mol) of trimethoxyvinylsilane, 403.0 g (3 mol) of 1,1,3,3-tetramethyldisiloxane, 1,778.8 g of 2-butanol, and 2,668.4 g of xylene. A mixture of 659.20 g of a 1.59% by mass hydrochloric acid aqueous solution and 889.4 g of 2-butanol was added dropwise to the flask from the dropping funnel at a temperature of 25° C. over 1 hour with stirring to effect hydrolysis and polycondensation. After the dropwise addition, the reaction mixture was allowed to stand at 25° C. for 18 hours.

The pressure inside the flask was reduced to 100 Pa, and the mixture was heated to 60° C. to evaporate a volatile component including water. 982.0 g of an almost colorless liquid (hereinafter referred to as "polysiloxane (P1)") was thus obtained. The polysiloxane (P1) was subjected to GPC for measurement of Mn, and it was 1,300. The viscosity of the polysiloxane (P1) was measured using an E-type viscometer, it was 100 mPa·s at 25° C.

Example 2

A four-necked flask equipped with a magnetic stirrer, a dropping funnel, a reflux condenser, and a thermometer was filled with nitrogen gas. Subsequently, the flask was charged with magnetic stirrer bars, 1,478.4 g (9 mol) of triethoxysilane, 444.7 g (3 mol) of trimethoxyvinylsilane, 403.0 g (3 mol) of 1,1,3,3-tetramethyldisiloxane, 177.8 g of 2-butanol, 577.00 g of 2-propanol, and 2,001.4 g of xylene. A mixture of 659.2 g of a 1.59% by mass hydrochloric acid aqueous solution, 89.0 g of 2-butanol, and 288.4 g of 2-propanol was added dropwise to the flask from the dropping funnel at a temperature of 25° C. over 1 hour with stirring to effect hydrolysis and polycondensation. After the dropwise addition, the reaction mixture was allowed to stand at 25° C. for 18 hours.

The pressure inside the flask was reduced to 100 Pa, and the mixture was heated to 60° C. to evaporate a volatile component including water. 892.0 g of an almost colorless liquid (hereinafter referred to as "polysiloxane (P2)") was thus obtained. The polysiloxane (P2) was subjected to GPC for measurement of Mn, and it was 1,900. The viscosity of the polysiloxane (P2) was measured using an E-type viscometer, it was 370 mPa·s at 25° C.

Example 3

A four-necked flask equipped with a magnetic stirrer, a dropping funnel, a reflux condenser, and a thermometer was filled with nitrogen gas. Subsequently, the flask was charged with 1,330.6 g (8.1 mol) of triethoxysilane, 400.2 g (2.7 mol) of trimethoxyvinylsilane, 162.2 g (1.35 mol) of dimethyldimethoxysilane, 362.6 g (2.7 mol) of 1,1,3,3-tetramethyldisiloxane, 1,734.4 g of 2-butanol, and 2,601.6 g of xylene. A mixture of 642.7 g of a 1.59% by mass hydrochloric acid aqueous solution, and 867.2 g of 2-butanol was added dropwise to the flask from the dropping funnel at a temperature of 25° C. over 1 hour with stirring to effect hydrolysis and polycondensation. After the dropwise addition, the reaction mixture was allowed to stand at 25° C. for 18 hours.

The pressure inside the flask was reduced to 100 Pa, and the mixture was heated to 60° C. to evaporate a volatile component including water. 958.6 g of an almost colorless liquid (hereinafter referred to as "polysiloxane (P3)") was thus obtained. The polysiloxane (P3) was subjected to GPC for measurement of Mn, and it was 1,200. The viscosity of the polysiloxane (P3) was measured using an E-type viscometer, it was 60 mPa·s at 25° C.

Example 4

A four-necked flask equipped with a magnetic stirrer, a dropping funnel, a reflux condenser, and a thermometer was filled with nitrogen gas. Subsequently, the flask was charged with 1,330.6 g (8.1 mol) of triethoxysilane, 400.2 g (2.7 mol) of trimethoxyvinylsilane, 162.2 g (1.35 mol) of dimethyldimethoxysilane, 362.6 g (2.7 mol) of 1,1,3,3-tetramethyldisiloxane, 173.4 g of 2-butanol, 562.6 g of 2-propanol, and 1,951.2 g of xylene. A mixture of 642.7 g of a 1.59% by mass hydrochloric acid aqueous solution, 86.8 g of 2-butanol, and 281.2 g of 2-propanol was added dropwise to the flask from the dropping funnel at a temperature of 25° C. over 1 hour with stirring to effect hydrolysis and polycondensation. After the dropwise addition, the reaction mixture was allowed to stand at 25° C. for 18 hours.

The pressure inside the flask was reduced to 100 Pa, and the mixture was heated to 60° C. to evaporate a volatile component including water. 1,014.4 g of an almost colorless liquid (hereinafter referred to as "polysiloxane (P4)") was thus obtained. The polysiloxane (P4) was subjected to GPC for measurement of Mn, and it was 1,700. The viscosity of the polysiloxane (P4) was measured using an E-type viscometer, it was 130 mPa·s at 25° C.

Example 5

A four-necked flask equipped with a magnetic stirrer, a dropping funnel, a reflux condenser, and a thermometer was filled with nitrogen gas. Subsequently, the flask was charged with 1,330.6 g (8.1 mol) of triethoxysilane, 400.2 g (2.7 mol) of trimethoxyvinylsilane, 162.2 g (1.35 mol) of dimethyldimethoxysilane, 362.6 g (2.7 mol) of 1,1,3,3-tetramethyldisiloxane, 173.4 g of 3-hexanol, 562.6 g of 2-propanol, and 1,951.2 g of xylene. A mixture of 642.7 g of a 1.59% by mass hydrochloric acid aqueous solution, 86.8 g of 3-hexanol, and 281.2 g of 2-propanol was added dropwise to the flask from the dropping funnel at a temperature of 25° C. over 1 hour with stirring to effect hydrolysis and polycondensation. After the dropwise addition, the reaction mixture was allowed to stand at 25° C. for 18 hours.

The pressure inside the flask was reduced to 100 Pa, and the mixture was heated to 60° C. to evaporate a volatile component including water. 1,013.7 g of an almost colorless liquid (hereinafter referred to as "polysiloxane (P5)") was thus obtained. The polysiloxane (P5) was subjected to GPC for measurement of Mn, and it was 1,600. The viscosity of the polysiloxane (P5) was measured using an E-type viscometer, it was 120 mPa·s at 25° C.

Comparative Example 1

A four-necked flask equipped with a magnetic stirrer, a dropping funnel, a reflux condenser, and a thermometer was filled with nitrogen gas. Subsequently, the flask was charged with 1,478.4 g (9 mol) of triethoxysilane, 444.7 g (3 mol) of trimethoxyvinylsilane, 403.0 g (3 mol) of 1,1,3,3-tetramethyldisiloxane, 1,442.4 g of 2-propanol, and 2,163.6 g of xylene. A mixture of 659.2 g of a 1.59% by mass hydrochloric acid aqueous solution, and 721.2 g of 2-propanol was added dropwise to the flask from the dropping funnel at a temperature of 25° C. over 1 hour with stirring to effect hydrolysis and polycondensation. After the dropwise addition, the reaction mixture was allowed to stand at 25° C. for 18 hours.

The pressure inside the flask was reduced to 100 Pa, and the mixture was heated to 60° C. to evaporate a volatile component including water. 955.0 g of an almost colorless liquid (hereinafter referred to as "polysiloxane (P6)") was thus obtained. The polysiloxane (P6) was subjected to GPC for measurement of Mn, and it was 2,000. The viscosity of the polysiloxane (P6) was measured using an E-type viscometer, it was 610 mPa·s at 25° C.

Comparative Example 2

A four-necked flask equipped with a magnetic stirrer, a dropping funnel, a reflux condenser, and a thermometer was filled with nitrogen gas. Subsequently, the flask was charged with 1,478.4 g (9 mol) of triethoxysilane, 444.7 g (3 mol) of trimethoxyvinylsilane, 403.0 g (3 mol) of 1,1,3,3-tetramethyldisiloxane, 1,778.8 g of 1-butanol, and 2,668.4 g of xylene. A mixture of 659.2 g of a 1.59% by mass hydrochloric acid aqueous solution, 889.4 g of 1-butanol, and 190.0 g of acetone was added dropwise to the flask from the dropping funnel at a temperature of 25° C. over 1 hour with stirring to effect hydrolysis and polycondensation. After the dropwise addition, the reaction mixture was allowed to stand at 25° C. for 18 hours.

The pressure inside the flask was reduced to 100 Pa, and the mixture was heated to 60° C. to evaporate a volatile component including water. 960.6 g of an almost colorless liquid (hereinafter referred to as "polysiloxane (P7)") was thus obtained. The polysiloxane (P7) was subjected to GPC for measurement of Mn, and it was 2,600. The viscosity of the polysiloxane (P7) was measured using an E-type viscometer, it was 3,850 mPa·s at 25° C.

Comparative Example 3

A four-necked flask equipped with a magnetic stirrer, a dropping funnel, a reflux condenser, and a thermometer was filled with nitrogen gas. Subsequently, the flask was charged with 1,182.8 g (7.2 mol) of triethoxysilane, 355.8 g (2.4 mol) of trimethoxyvinylsilane, 322.4 g (2.4 mol) of 1,1,3,3-tetramethyldisiloxane, 1,730.4 g of propylene glycol monomethyl ether, and 2,595.8 g of xylene. A mixture of 527.4 g of a 1.59% by mass hydrochloric acid aqueous solution, and 865.2 g of propylene glycol monomethyl ether was added dropwise to the flask from the dropping funnel at a temperature of 25° C. over 1 hour with stirring to effect hydrolysis and polycondensation. After the dropwise addition, the reaction mixture was allowed to stand at 25° C. for 18 hours.

The pressure inside the flask was reduced to 100 Pa, and the mixture was heated to 60° C. in order to evaporate a volatile component including water. But the product in the reaction mixture gelled during evaporation.

Comparative Example 4

A four-necked flask equipped with a magnetic stirrer, a dropping funnel, a reflux condenser, and a thermometer was filled with nitrogen gas. Subsequently, the flask was charged with 1,330.6 g (8.1 mol) of triethoxysilane, 400.2 g (2.7 mol) of trimethoxyvinylsilane, 162.2 g (1.35 mol) of dimethyldimethoxysilane, 362.6 g (2.7 mol) of 1,1,3,3-tetramethyldisiloxane, 1,406.4 g of 2-propanol, and 2,109.6 g of xylene. A mixture of 642.7 g of a 1.59% by mass hydrochloric acid aqueous solution, and 703.2 g of 2-propanol was added dropwise to the flask from the dropping funnel at a temperature of 25° C. over 1 hour with stirring to effect hydrolysis and polycondensation. After the dropwise addition, the reaction mixture was allowed to stand at 25° C. for 18 hours.

The pressure inside the flask was reduced to 100 Pa, and the mixture was heated to 60° C. to evaporate a volatile component including water. 958.60 g of an almost colorless liquid (hereinafter referred to as "polysiloxane (P8)") was thus obtained. The polysiloxane (P8) was subjected to GPC for measurement of Mn, and it was 1,500. The viscosity of the polysiloxane (P8) was measured using an E-type viscometer, it was 130 mPa·s at 25° C.

Table 1 shows the composition of the reaction solvents used for the condensation step in Examples 1 to 5 and Comparative Examples 1 to 4. The mass ratio of the reaction solvents was calculated using the total amount of the solvent initially added and the solvent added during the reaction.

TABLE 1

| | Reaction solvent (mass ratio) | | | | | |
|---|---|---|---|---|---|---|
| | Alcohol having 4 to 6 carbon atoms | | Polar solvent | | Nonpolar solvent | |
| Example 1 | 2-Butanol | 1 | — | — | Xylene | 1 |
| Example 2 | 2-Butanol | 0.1 | 2-Propanol | 0.32 | Xylene | 0.75 |
| Example 3 | 2-Butanol | 1 | — | — | Xylene | 1 |
| Example 4 | 2-Butanol | 0.1 | 2-Propanol | 0.32 | Xylene | 0.75 |
| Example 5 | 3-Hexanol | 0.1 | 2-Propanol | 0.24 | Xylene | 0.54 |
| Comparative Example 1 | — | — | 2-Propanol | 1 | Xylene | 1 |
| Comparative Example 2 | — | — | 1-Butanol | 1 | Xylene | 1 |
| Comparative Example 3 | — | — | Propylene glycol monomethyl ether | 1 | Xylene | 1 |
| Comparative Example 4 | — | — | 2-Propanol | 1 | Xylene | 1 |

Table 2 shows the composition and the properties of the polysiloxans obtained in Examples 1 to 5 and Comparative Examples 1 to 4. Table 2 shows the type and the molar ratio of each structural unit as the composition of the polysiloxane. In Table 2, Vi refers to a vinyl group, Me refers to a methyl group, Et refers to an ethyl group, iPr refers to an isopropyl group, and secBu refers to an sec-butyl group (2-butyl group).

The compositional ratio (molar ratio) of the polysiloxane was determined by subjecting the polysiloxane to $^1$H-NMR measurement, formulating simultaneous equations relating to the side chain from each signal intensity integral value, and solving the simultaneous equations provided that a signal at a chemical shift δ (ppm) of −0.2 to 0.6 is attributed to Si—CH$_3$, a signal at a chemical shift δ (ppm) of 0.8 to 1.5 is attributed to OCH(CH$_3$)CH$_2$CH$_3$, OCH(CH$_3$)$_2$, and OCH$_2$CH$_3$, a signal at a chemical shift δ (ppm) of 3.5 to 3.9 is attributed to OCH$_2$CH$_3$, a signal at a chemical shift δ (ppm) of 3.9 to 4.1 is attributed to OCH(CH$_3$)CH$_2$CH$_3$, a signal at a chemical shift δ (ppm) of 4.2 to 5.2 is attributed to Si—H, and a signal at a chemical shift δ (ppm) of 5.7 to 6.3 is attributed to CH=CH$_2$. Since the T monomer (e.g., triethoxysilane or trimethoxyvinylsilane) is incorporated directly in the polysiloxane, the molar ratio of each structural unit was determined from the amount of each monomer and the NMR value.

The polysiloxane obtained in Comparative Example 2 was not dissolved in deuterated chloroform, and the $^1$H-NMR measurement was omitted. The polysiloxane obtained by the condensation step in Comparative Example 3 gelled during the evaporation step, the property measurement and the $^1$H-NMR measurement were omitted.

TABLE 2

Composition of polysiloxane $$\left(SiO_{4/2}\right)_u \left(H{-}SiO_{3/2}\right)_v \left(A{-}(R^1)_n{-}SiO_{3/2}\right)_w \left(\begin{array}{c}R^2\\|\\SiO_{2/2}\\|\\R^2\end{array}\right)_x \left(\begin{array}{c}R^4\\|\\R^3{-}SiO_{1/2}\\|\\R^4\end{array}\right)_y \left(R^5O_{1/2}\right)_z$$

| | | Structural unit formed by condensation step | | | Alkoxy group produced | | | | Properties | | |
|---|---|---|---|---|---|---|---|---|---|---|---|
| | | Structural unit T | | Structural unit D | Structural unit M | | | | | | |
| | Polysiloxane | HSiO$_{3/2}$ v | ViSiO$_{3/2}$ w | Me$_2$SiO$_{2/2}$ x | H(Me)$_2$SiO$_{1/2}$ y | secBuO$_{1/2}$ | 3HeO$_{1/2}$ z | iPrO$_{1/2}$ | EtO$_{1/2}$ | Mw | Mn | Viscosity (mPa·s) |
| Example 1 | P1 | 3.0 | 1.0 | — | 1.1 | 0.42 | — | — | 0.028 | 2,500 | 1,300 | 100 |
| Example 2 | P2 | 3.0 | 1.0 | — | 1.2 | 0.08 | — | 0.04 | 0.047 | 4,500 | 1,900 | 370 |
| Example 3 | P3 | 3.0 | 1.0 | 0.5 | 1.2 | 0.40 | — | — | 0 | 2,200 | 1,200 | 60 |
| Example 4 | P4 | 3.0 | 1.0 | 0.5 | 1.2 | 0.08 | — | 0.05 | 0.050 | 3,600 | 1,700 | 130 |
| Example 5 | P5 | 3.0 | 1.0 | 0.5 | 1.2 | — | 0.06 | 0.05 | 0.050 | 3,300 | 1,600 | 120 |
| Comparative Example 1 | P6 | 3.0 | 1.0 | — | 1.1 | — | — | 0.2 | 0.055 | 7,000 | 2,000 | 610 |
| Comparative Example 2 | P7 | — | — | — | — | — | — | — | — | 59,700 | 2,600 | 3,850 |
| Comparative Example 3 | — | — | — | — | — | — | — | — | — | — | — | — |

TABLE 2-continued

Composition of polysiloxane $$\left(SiO_{4/2}\right)_u \left(H\!-\!SiO_{3/2}\right)_v \left(A\!-\!(R^1)_n\!-\!SiO_{3/2}\right)_w \left(\begin{array}{c}R^2\\|\\SiO_{2/2}\\|\\R^2\end{array}\right)_x \left(\begin{array}{c}R^4\\|\\R^3\!-\!SiO_{1/2}\\|\\R^4\end{array}\right)_y \left(R^5O_{1/2}\right)_z$$

| | | Structural unit formed by condensation step | | | | | | | Properties | | |
|---|---|---|---|---|---|---|---|---|---|---|---|
| | | Structural unit T | | Structural unit D | Structural unit M | Alkoxy group produced | | | | | |
| | Poly-siloxane | HSiO$_{3/2}$ v | ViSiO$_{3/2}$ w | Me$_2$SiO$_{2/2}$ x | H(Me)$_2$SiO$_{1/2}$ y | secBuO$_{1/2}$ | 3HeO$_{1/2}$ z | iPrO$_{1/2}$ | EtO$_{1/2}$ | Mw | Mn | Viscosity (mPa·s) |
| Comparative Example 4 | P8 | 3.0 | 1.0 | 0.5 | 1.1 | — | — | 0.14 | 0.100 | 3,100 | 1,500 | 130 |

Vi: vinyl group,
Me: methyl group,
Et: ethyl group,
iPr: isopropyl group,
secBu: sec-butyl group,
3He: 3-hexyl group The storage stability of the polysiloxane is described below.

The polysiloxane (polysiloxanes obtained in Examples 1 to 5 and Comparative Examples 1, 2, and 4) was put in a glass sample bottle that can be sealed, and allowed to stand for 3 days in an explosion-proof drier maintained at temperature of about 40° C. (38° C. to 42° C.). The polysiloxane was then subjected to GPC measurement for Mw and viscosity measurement, and the storage stability was evaluated based on the change ratio with respect to the value (see Table 2) measured immediately after production. A value obtained by dividing the Mw measured after the lapse of 3 days by the Mw measured immediately after production was taken as "change ratio $D_M$" of Mw. A value obtained by dividing the viscosity measured after the lapse of 3 days by the viscosity measured immediately after production was taken as "change ratio $D_V$" of viscosity. The storage stability evaluation results are shown in Table 3.

showed small change ratios $D_M$ and $D_V$. In particular, the polysiloxanes obtained in Examples 2 and 4 in which 2-butanol, a polar solvent, and a nonpolar solvent were used as the reaction solvents, respectively, showed small change ratios $D_M$ and $D_V$ as compared with the polysiloxanes obtained in Examples 1 and 3 in which a polar solvent was not used.

INDUSTRIAL APPLICABILITY

Since a polysiloxane produced by the method of the present invention can undergo hydrosilylation, a heat-resistant cured product can be formed by crosslinking the polysiloxane. The cured product exhibits excellent properties including heat resistance, water resistance, chemical resistance, stability, electrical insulating properties, and mechanical strength such as scratch resistance, and therefore the cured product may be used as a protective film or a layer for articles,

TABLE 3

| | | Mw | | | Viscosity (mPa·s) | | |
|---|---|---|---|---|---|---|---|
| | Polysiloxane | Immediately after production | After 3 days (40° C.) | Change ratio $D_M$ | Immediately after production | After 3 days (40° C.) | Change ratio $D_V$ |
| Example 1 | P1 | 2,500 | 3,100 | 1.24 | 100 | 126 | 1.25 |
| Example 2 | P2 | 4,500 | 5,100 | 1.13 | 370 | 450 | 1.22 |
| Example 3 | P3 | 2,200 | 2,500 | 1.14 | 60 | 70 | 1.17 |
| Example 4 | P4 | 3,600 | 3,800 | 1.06 | 130 | 140 | 1.08 |
| Example 5 | P5 | 3,300 | 3,600 | 1.09 | 120 | 140 | 1.17 |
| Comparative Example 1 | P6 | 7,000 | Gelled | — | 610 | Gelled | — |
| Comparative Example 2 | P7 | 59,700 | Gelled | — | 3,850 | Gelled | — |
| Comparative Example 4 | P8 | 3,100 | 6,200 | 2.00 | 130 | 280 | 2.15 |

The polysiloxanes obtained in Comparative Examples 1 and 2 gelled when 1 day had elapsed after starting the storage stability test. The polysiloxane obtained in Comparative Example 4 exhibited the change ratios $D_M$ and $D_V$ of 2.00 or more as compared with the polysiloxanes obtained in Examples 1 to 5, being inferior in storage stability. On the other hand, the polysiloxanes obtained in Examples 1 to 5 parts, and the like used in various fields such as the electronics field, the optical functional material field, and the aerospace field.

What is claimed is:
1. A production method of a polysiloxane represented by the following general formula (1), comprising:

subjecting a raw material monomer to hydrolysis and polycondensation in a reaction solvent comprising at least one alcohol (S) selected from a secondary alcohol comprising 4 to 6 carbon atoms and a tertiary alcohol comprising 4 to 6 carbon atoms;

wherein the raw material monomer comprises a compound that forms a structural unit (1-2) through a method of condensation; and wherein at least one compound selected from the group consisting of a compound that forms:
a structural unit (1-3) through a method of condensation;
a structural unit (1-4) through a method of condensation; and
a structural unit (1-5) through a method of condensation;

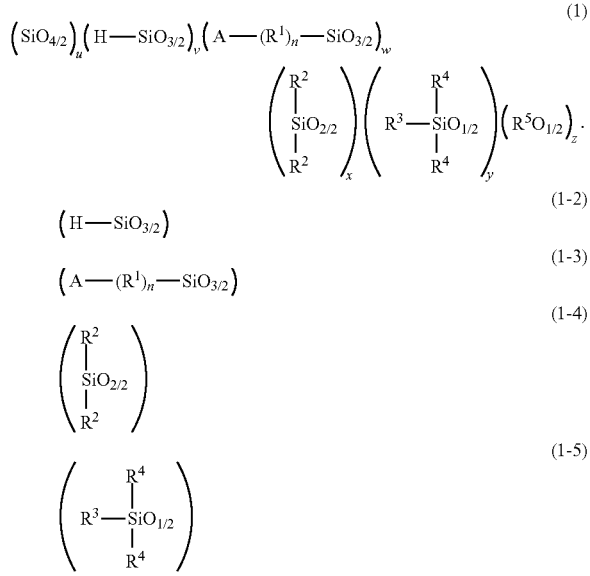

wherein:

A is an organic group having 2 to 10 carbon atoms that comprises a carbon-carbon unsaturated bond and is capable of undergoing hydrosilation;

$R^1$ is at least one group selected from the group consisting of an alkylene group having 1 to 20 carbon atoms, a divalent aromatic group having 6 to 20 carbon atoms, and a divalent alicyclic group having 3 to 20 carbon atoms;

n is 0 or 1;

$R^2$ is a hydrogen atom or at least one group selected from the group consisting of an alkyl group having 1 to 10 carbon atoms, and an organic group having 2 to 10 carbon atoms that comprises a carbon-carbon unsaturated bond and is capable of undergoing hydrosilation, provided that a plurality of $R^2$ in one molecule are either identical or different;

$R^3$ is a hydrogen atom or at least one group selected from the group consisting of an alkyl group having 1 to 10 carbon atoms, and an organic group having 2 to 10 carbon atoms that comprises a carbon-carbon unsaturated bond and is capable of undergoing hydrosilation;

$R^4$ is a hydrogen atom or at least one group selected from the group consisting of an alkyl group having 1 to 10 carbon atoms, and an organic group having 2 to 10 carbon atoms that comprises a carbon-carbon unsaturated bond and is capable of undergoing hydrosilation, provided that a plurality of $R^4$ in one molecule are either identical or different;

$R^5$ is a hydrogen atom or an alkyl group having 1 to 6 carbon atoms;

v is a positive number;

u, w, x, y, and z are 0 or a positive number, provided that at least one of w, x, and y is a positive number, $0 \leq u/(v+w+x+y) \leq 2$, $0 \leq x/(v+w) \leq 2$, $0 \leq y/(v+w) \leq 2$, $0 \leq z/(v+w+x+y) \leq 1$, and at least one of $R^2$, $R^3$, and $R^4$ is an organic group having 2 to 10 carbon atoms that comprises a carbon-carbon unsaturated bond and is capable of undergoing hydrosilation when w is 0.

2. The method of claim 1, wherein a content of the alcohol (S) in the reaction solvent is in a range from 1% to 60% by mass based on an entire amount of the reaction solvent.

3. The method of claim 1, further comprising an evaporation step that evaporates at least part of the reaction solvent, a by-product, a residual monomer and water that are included in a reaction mixture after the condensation step.

4. The method of claim 1, wherein the reaction solvent further comprises a nonpolar solvent.

5. The method of claim 4, wherein the reaction solvent further comprises a polar solvent different from the alcohol (S) and in addition to the alcohol (S).

6. The method of claim 4, wherein the nonpolar solvent is an aromatic hydrocarbon.

7. The method of claim 5, wherein the polar solvent is a 2-propanol.

8. The method of claim 1, wherein the alcohol (S) is at least one selected from the group consisting of 2-butanol, 2-pentanol, 3-pentanol, 3-methyl-2-butanol, cyclopentanol, 2-hexanol, 3-hexanol, 3-methyl-2-pentanol and cyclohexanol.

9. The method of claim 1, wherein the raw material monomer comprises the compound that forms the structural unit (1-2), the compound that forms the structural unit (1-3) and the compound that forms the structural unit (1-5).

10. The method of claim 9, wherein the raw material monomer comprises the compound that forms the structural unit (1-4).

11. The method of claim 1, wherein the compound that forms the structural unit (1-2) is at least one compound selected from the group consisting of trimethoxysilane, triethoxysilane, tripropoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, cyclohexyltrimethoxysilane, cyclohexyltriethoxysilane, and trichlorosilane.

12. The method of claim 1, wherein the compound that forms the structural unit (1-3) is at least one compound selected from the group consisting of trimethoxyvinylsilane, triethoxyvinylsilane, (p-styryl)trimethoxysilane, (p-styryl)triethoxysilane, (3-methacryloyloxypropyl)trimethoxysilane, (3-methacryloyloxypropyl)triethoxysilane, (3-acryloyloxypropyl)trimethoxysilane, and (3-acryloyloxypropyl)triethoxysilane.

13. The method of claim 1, wherein the compound that forms the structural unit (1-4) is at least one compound selected from the group consisting of dimethoxydimethylsilane, dimethoxydiethylsilane, diethoxymethylsilane, diethoxydiethylsilane, dipropoxydimethylsilane, dipropoxydiethylsilane, dimethoxybenzylmethylsilane, diethoxybenzylmethylsilane, and dichlorodimethylsilane.

14. The method of claim 1, wherein the compound that forms the structural unit (1-5) is at least one compound selected from the group consisting of hexaethyldisiloxane, hexapropyldisiloxane, 1,1,3,3-tetramethyldisiloxane, 1,3-divinyl-1,1,3,3-tetramethyldisiloxane, methoxydimethylsilane, ethoxydimethylsilane, methoxydimethylvinylsilane, ethoxydimethylvinylsilane, methoxytrimethylsilane, ethoxytrimethylsilane, methoxydimethyiphenylsilane, ethoxydimethylphenylsilane, chlorodimethylsilane, chlorodimethylvinylsilane, chlorotrimethylsilane, dimethylsilanol, dimethylvinylsilanol, trimethylsilanol, triethylsilanol, tripropylsilanol, and tributylsilanol.

\* \* \* \* \*